US011247262B2

(12) United States Patent
Hosoi et al.

(10) Patent No.: US 11,247,262 B2
(45) Date of Patent: Feb. 15, 2022

(54) VEHICLE KNUCKLE

(71) Applicant: Kobe Steel, Ltd., Kobe (JP)

(72) Inventors: Hiroaki Hosoi, Kobe (JP); Kouki Sugino, Kobe (JP); Keiji Yazaki, Inabe (JP); Teppei Hoshino, Inabe (JP)

(73) Assignee: Kobe Steel, Ltd., Kobe (JP)

( * ) Notice: Subject to any disclaimer, the term of this patent is extended or adjusted under 35 U.S.C. 154(b) by 209 days.

(21) Appl. No.: 16/630,628

(22) PCT Filed: Aug. 3, 2018

(86) PCT No.: PCT/JP2018/029264
§ 371 (c)(1),
(2) Date: Jan. 13, 2020

(87) PCT Pub. No.: WO2019/031413
PCT Pub. Date: Feb. 14, 2019

(65) Prior Publication Data
US 2020/0130048 A1    Apr. 30, 2020

(30) Foreign Application Priority Data

Aug. 9, 2017   (JP) .............................. JP2017-154568
May 9, 2018    (JP) .............................. JP2018-090292

(51) Int. Cl.
*B60G 7/00*    (2006.01)
*B21K 1/14*    (2006.01)

(52) U.S. Cl.
CPC . *B21K 1/14* (2013.01); *B60G 7/00* (2013.01)

(58) Field of Classification Search
CPC .................. B60G 3/20; B60G 2206/50; B60G 2206/81022; B60G 2200/144;
(Continued)

(56) References Cited

U.S. PATENT DOCUMENTS 9,643,646 B2 *   5/2017   Conner ................... B62D 7/18
9,643,647 B2 *   5/2017   Conner ................. B60G 7/001
(Continued)

FOREIGN PATENT DOCUMENTS

JP           2014-91469 A       5/2014
JP           2016-60459 A       4/2016
WO    WO-2011129431 A1 *    10/2011    ............. C22C 21/02

OTHER PUBLICATIONS

International Search Report dated Sep. 18, 2018 in PCT/JP2018/029264 filed Aug. 3, 2018, citing document AO therein, 2 pages

*Primary Examiner* — James A English
(74) *Attorney, Agent, or Firm* — Oblon, McClelland, Maier & Neustadt, L.L.P.

(57) ABSTRACT

The objective of the present invention is to improve the rigidity of a vehicle knuckle made from an aluminum alloy with respect to a force directed from the outside to the inside in the width direction of a vehicle. A vehicle knuckle (11) is provided with a bearing support portion (111), a knuckle upper portion (113) and a knuckle lower portion (112). With the vehicle knuckle (11) in a position fitted to a vehicle main body, the knuckle upper portion (113) has a shape in which, if the knuckle upper portion (113) is divided equally into five or more regions in a vertical direction, and the center of the bearing support portion (111) is fixed and a horizontal load F is applied to a knuckle upper end portion (115) from the outside toward the inside in the width direction of the vehicle, the minimum value of a value obtained by dividing the strain energy in each of the five or more regions other than a first region (11A) by the mass of the corresponding region is at least equal to 0.70 times the maximum value thereof.

3 Claims, 5 Drawing Sheets

(58) Field of Classification Search
CPC ........ B60G 2204/43; B60G 2204/4306; B60G 2204/4307
See application file for complete search history.

(56) References Cited

U.S. PATENT DOCUMENTS

2020/0001674 A1*  1/2020  Hosoi .................... B60G 7/001
2020/0223272 A1*  7/2020  Hosoi ...................... B62D 7/18

* cited by examiner

VEHICLE KNUCKLE

FIELD OF THE INVENTION

The present invention relates to a vehicle knuckle that pivotally supports wheels.

BACKGROUND ART

Conventionally, there is known a suspension unit that connects a vehicle body and wheels of a motor vehicle while pivotally supporting the wheels. The suspension unit has functions of maintaining the position of the wheels and preventing shock (road noise) caused by uneven road surfaces from being transferred to the vehicle body. Such a suspension unit is categorized as an important safety part that is required to ensure high level of safety among parts of the motor vehicle. In addition, a reduction in the weight of the suspension unit contributes to the motion performance of the motor vehicle and the ride comfort of the motor vehicle's occupants. For this reason, in recent years, an aluminum alloy has tended to be used for members constituting the suspension unit, in place of a steel sheet or cast iron.

Patent Document 1 discloses a steering knuckle made of aluminum. The knuckle is one of the members constituting the suspension unit and has a function of connecting a suspension arm, such as a lower arm, or a steering rack to a hub for pivotally supporting the wheel. In particular, a support structure, which is so-called a double-wishbone system or a multi-link system, employs a knuckle extending long in the vertical direction, which is called a high-mount knuckle.

Such a knuckle is required to have adequate rigidity and strength against a load generated at the tire contact point of the wheel. Especially, high rigidity against a force directed from the outside to the inside in the width direction of a vehicle is required for the knuckle. In addition, high strength against a force directed from the front to the rear side of the vehicle is required for the knuckle. Patent Document 2 discloses a knuckle structure that supports a pair of upper arms. The pair of upper arms is connected to a coupling portion provided at an upper end portion of the knuckle. The coupling portion includes an expansion portion that is expanded in a convex shape, thereby improving the strength of the coupling portion in the knuckle.

RELATED ART DOCUMENTS

Patent Documents

Patent Document 1: JP 2014-091469 A
Patent Document 2: JP 2016-060459 A

SUMMARY OF THE INVENTION

As mentioned above, the formation of the vehicle knuckle included in the suspension unit using an aluminum alloy can contribute to a reduction in the weight of motor vehicles. In recent years, the strength of the aluminum alloy has been improved, but its Young's modulus has not changed significantly. Thus, when the knuckle is reduced in weight by being made of an aluminum alloy, there is a problem that the rigidity of the knuckle, especially, its rigidity against the force directed from the outside to the inside in the width direction of the vehicle is difficult to ensure.

Accordingly, it is an object of the present invention to improve the rigidity of a vehicle knuckle made of an aluminum alloy, against a force directed from the outside to the inside in the width direction of a vehicle.

A vehicle knuckle made of an aluminum alloy is provided which includes a bearing support portion, a knuckle upper portion, and a knuckle lower portion. The bearing support portion supports a bearing portion that forms a rotational axis of a wheel. The knuckle upper portion extends upward from the bearing support portion and has a knuckle upper end portion. The knuckle lower portion extends downward from the bearing support portion and is connected to a lower arm. In a position where the vehicle knuckle is fitted to a vehicle main body, the knuckle upper portion has a shape in which, when the knuckle upper portion is equally divided into five or more regions along a vertical direction and a horizontal load directed from an outside to an inside in a width direction of a vehicle is applied to the knuckle upper end portion while fixing a center of the bearing support portion, a minimum value among values obtained by dividing a strain energy in each of the other regions of the five or more regions, except for a region including the knuckle upper end portion and located at an uppermost position, by a mass of the corresponding region is at least equal to 0.70 times a maximum value thereamong.

DESCRIPTION OF EMBODIMENTS

Figure 1:
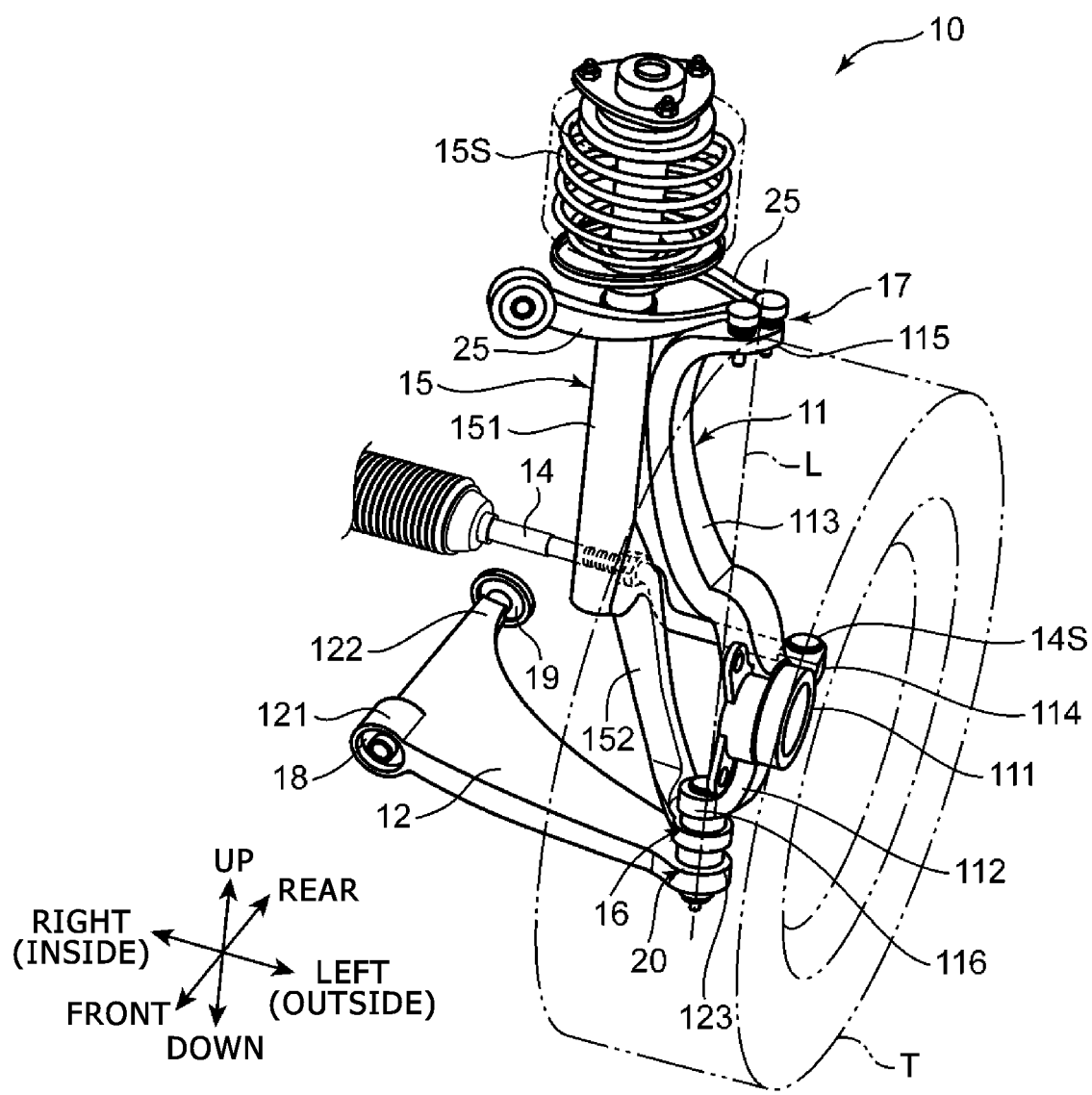
FIG. 1 is a perspective view of a suspension unit that includes a vehicle knuckle according to an embodiment of the present invention.
Figure 2:
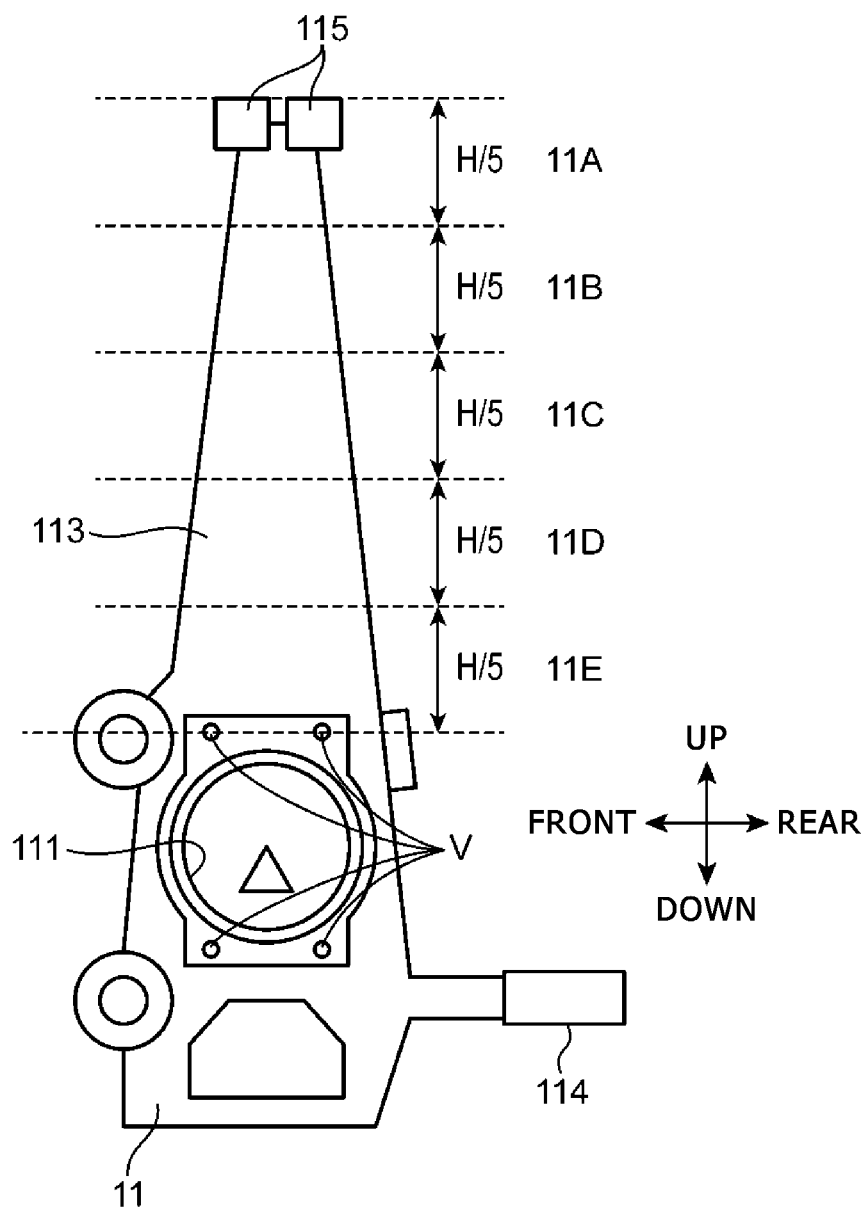
FIG. 2 is a schematic side view of the vehicle knuckle according to the embodiment of the present invention.
Figure 3:
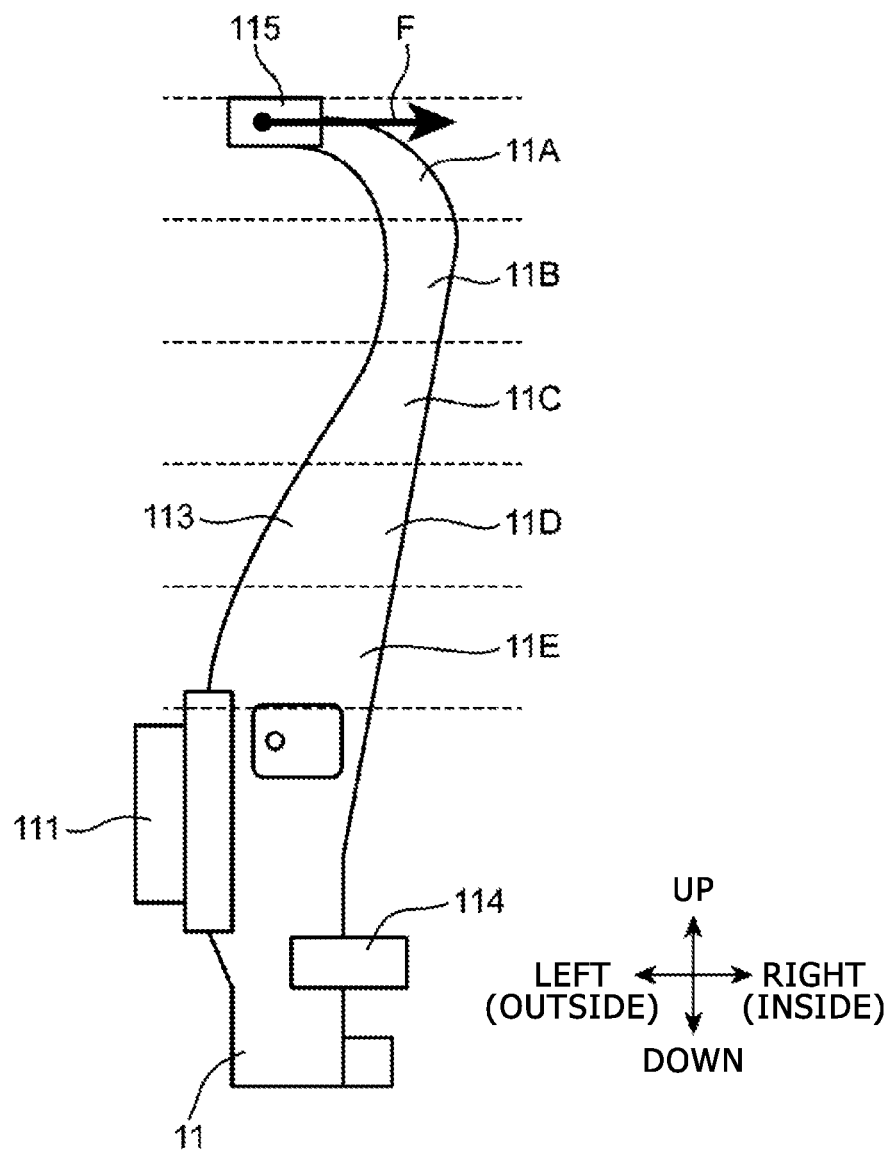
FIG. 3 is a schematic back view of the vehicle knuckle according to the embodiment of the present invention.

Hereinafter, a high-mount knuckle 11 (vehicle knuckle) according to an embodiment of the present invention will be schematically described with reference to FIGS. 1 to 3. FIG. 1 is a perspective view of a suspension unit 10 that includes the high-mount knuckle 11 according to the present embodiment. FIG. 2 is a schematic side view of the high-mount knuckle 11. FIG. 3 is a schematic back view of the high-mount knuckle 11. It is noted that regarding the directions indicated in each figure, left (outside) and right (inside) refers to the left direction which is oriented toward the outside in the width direction of the vehicle and the right direction which is oriented toward the inside in the width direction of the vehicle, respectively.

The suspension unit 10 is a unit fitted to a vehicle main body of a motor vehicle (not shown) and supports wheels T of the motor vehicle rotatably and steerably. By way of example, in the present embodiment, a pair of suspension units 10 is disposed corresponding to the respective left and right front wheels of the motor vehicle. Each suspension unit 10 includes the high-mount knuckle 11, a lower arm 12, a tie rod 14, a shock absorber 15, and a pair of upper arms 25.

The high-mount knuckle 11 is a member which is made of an aluminum alloy and connected to the lower arm 12 and the shock absorber 15 while rotatably supporting the wheel T. The high-mount knuckle 11 includes a bearing support portion 111, a knuckle lower portion 112, a knuckle upper portion 113, and a tie rod shaft support portion 114.

The bearing support portion 111 is a cylindrical portion that extends along the width direction of the vehicle. The bearing support portion 111 supports a bearing portion (not shown) that forms a rotational axis of the wheel T. The shaft of the wheel T is inserted into the bearing support portion 111.

The knuckle lower portion 112 extends downward from the bearing support portion 111. The knuckle lower portion 112 has a knuckle lower end portion 116. The knuckle lower end portion 116 is disposed at a lower end portion of the knuckle lower portion 112. The knuckle lower end portion 116 is connected to and supported pivotally by the lower end portion of a lower arm 152 of the shock absorber 15 via a lower joint 16 in a rotatable manner.

The knuckle upper portion 113 extends upward from the bearing support portion 111. The knuckle upper portion 113 has a knuckle upper end portion 115. The knuckle upper end portion 115 is disposed at an upper end portion of the knuckle upper portion 113. The knuckle upper end portion 115 is connected to and pivotally supported by the respective end portions of the pair of upper arms 25 via upper joints 17 in a rotatable manner. The other end portions of the pair of upper arms 25 are respectively connected to the vehicle main body so as to be rotatable in the vertical direction.

As shown in FIG. 1, the knuckle upper portion 113 of the high-mount knuckle 11 extends upward so that it is curved inward in the width direction of the vehicle from the bearing support portion 111 and then curved outward in the width direction of the vehicle. Consequently, the knuckle upper end portion 115 is located above an upper end portion of the wheel T. In other words, the bearing support portion 111 is disposed inside the wheel T while the knuckle upper end portion 115 is disposed above the wheel T, and the knuckle upper portion 113 is curved inward in the width direction of the vehicle so as to avoid the interference with the wheel T. Consequently, the knuckle upper portion 113 has an arch shape that connects the bearing support portion 111 and the knuckle upper end portion 115. A knuckle axis L serving as the rotational axis of the high-mount knuckle 11 is formed between the knuckle upper end portion 115 and the knuckle lower end portion 116.

The tie rod shaft support portion 114 (see FIGS. 1 and 2) extends rearward from the knuckle lower portion 112, below the bearing support portion 111. The tie rod shaft support portion 114 pivotally supports a tip end 14S of the tie rod 14 in a rotatable manner.

In the present embodiment, the high-mount knuckle 11 is integrally formed by hot forging using an aluminum alloy material. In addition, as described later, a 0.2% proof stress of the high-mount knuckle 11 in a tensile test is set to 350 MPa or more.

The lower arm 12 is a plate-shaped member having a substantially triangular shape in the plan view. The lower arm 12 has a front bushing support portion 121, a rear bushing support portion 122, and a joint support portion 123, each located at the corresponding corner of the triangle. The front bushing support portion 121 and the rear bushing support portion 122 are spaced apart from each other in the front-rear direction, inside the lower arm 12 in the width direction of the vehicle. The front bushing support portion 121 receives a front bushing 18 therein. Likewise, the rear bushing support portion 122 receives a rear bushing 19 therein. Consequently, the lower arm 12 is swingably supported by the vehicle main body (not shown) via the front bushing 18 and the rear bushing 19. At this time, the lower arm 12 is allowed to swing about an axis thereof extending in the front-rear direction through the front bushing 18 and the rear bushing 19. In other words, the joint support portion 123 disposed outside the lower arm 12 in the width direction of the vehicle is movable vertically with the above-mentioned axis centered.

The tie rod 14 extends from a steering gear box (not shown). The tie rod 14 has the tip end 14S. The tip end 14S is rotatably connected to the tie rod shaft support portion 114 of the high-mount knuckle 11. When the tie rod 14 moves to the left or right side as the motor vehicle operates, the high-mount knuckle 11 rotates about the knuckle axis L to steer the wheel T around the knuckle axis L.

The shock absorber 15 includes an extendable hydraulic cylinder 151, the lower arm 152, and a spring 15S. The hydraulic cylinder 151 is a main body portion of the shock absorber 15 and expands and contracts together with the vertical movement of the wheels T following uneven road surfaces. The spring 15S is disposed coaxially with the hydraulic cylinder 151 at an outer periphery of an upper portion of the hydraulic cylinder 151 and exhibits its damping function by expanding and contracting in accordance with the expansion and contraction of the hydraulic cylinder 151. The lower arm 152 is an arm portion that extends downward from the hydraulic cylinder 151 and which is pivotally supported by the joint support portion 123 of the lower arm 12 via a ball joint 20.

Such a suspension unit 10 is a suspension device mounted between the vehicle main body and the wheel T of the motor vehicle. The suspension unit 10 has functions of holding the wheel (tire) T to maintain the position of the wheel T and preventing an uneven road surface condition (road noise) from affecting the vehicle main body. For this reason, each member constituting the suspension unit 10 is required to have high level of safety. The reduction in the weight of each member of the suspension unit 10 contributes to a reduction in the unsprung weight of the motor vehicle (i.e., the total weight of parts of the motor vehicle located below the spring 15S), which significantly contributes to the improvement of the motion performance of the motor vehicle and the ride comfort of drivers, and the like. Thus, particularly, the reduction in the weight of the suspension unit 10 has higher priority than the reduction in the weight of other parts of the motor vehicle. Conventionally, a steel sheet or cast iron has been used in the suspension units 10. However, in recent years, an aluminum alloy has been increasingly used especially in luxury vehicles. Each member of the suspension unit 10 is required to have adequate rigidity, yield strength, and fatigue strength against external forces from various input directions. Furthermore, the reliability of each member of the suspension unit 10 under a corrosive environment is also evaluated strictly.

An aluminum alloy has approximately one third the density of steel material and has a relatively high strength. Thus, by replacing the material of the suspension unit 10, such as a steel sheet or cast iron, with an aluminum alloy, the weight of the suspension unit 10 can be generally reduced by approximately 40 to 60%. In general, the use of an aluminum alloy having a high 0.2% proof stress among various aluminum alloys or the tempering of the aluminum alloy can enhance the effect of reducing the weight of the suspension unit. Although among these aluminum alloys, 2000-series, 6000-series and 7000-series alloys, which are heat-treated alloys, are suitable from the viewpoint of material strength, the 2000-series and 7000-series alloys are inferior in corrosion resistance, compared to the 6000-series alloy. Therefore, the suspension unit 10 may adopt 6000-series alloys, especially a 6082 alloy, a 6061 alloy, or an improved alloy with a similar composition thereof, which can satisfy both strength and corrosion resistance, in many cases. For the 6000-series alloy, generally, temper aging is performed by a T6 treatment or T7 treatment.

Of the members constituting the suspension unit 10, the high-mount knuckle 11 and the lower arm 12 are formed by hot forging. In the present embodiment, the final shapes of these members are obtained through two to four hot forging processes. In this case, the formed members by the hot forging have higher degree of flexibility in their shape than a plate shaped member or an extruded member, and thus can achieve an arbitrary thickness or cross-sectional shape. This can make the structural design of the suspension unit including these members flexible.

In particular, the knuckle is a member included in the suspension unit 10. In the known double-wishbone system or multi-link system, the knuckle called the high-mount knuckle is used like the present embodiment. The high-mount knuckle 11 is required to exhibit high rigidity and strength against the load thereon generated at the tire contact point. Regarding the rigidity, especially, the high rigidity against an external force directed from the outside to the inside in the width direction of the vehicle is required. Meanwhile, regarding the strength, especially, the high strength against an external force directed from the front to the rear side of the vehicle is also required.

As mentioned above, the high-mount knuckle 11 included in the suspension unit 10 is made of an aluminum alloy, which can contribute to a reduction in the weight of the motor vehicle. In recent years, the strength of the aluminum alloy has been improved, but its Young's modulus has not changed significantly. Thus, when the high-mount knuckle 11 is reduced in weight by being made of an aluminum alloy, there is a problem that the rigidity of the high-mount knuckle 11, especially, its rigidity against the force directed from the outside to the inside in the width direction of the vehicle is difficult to ensure.

To solve the above-mentioned problems, in the present embodiment, the high-mount knuckle 11 is characterized by the shape of the knuckle upper portion 113. In the position where the high-mount knuckle 11 is fitted to the vehicle main body of the motor vehicle, as shown in FIGS. 2 and 3, the knuckle upper portion 113 is virtually divided equally into five regions along a vertical direction. It is noted that in FIG. 2, H is defined as the length of the knuckle upper portion 113 in the vertical direction. The length H is desirably set in a range from 150 mm or more to 400 mm or less in order to further exhibit the effects to be described later. At this time, the five regions are defined as a first region 11A, a second region 11B, a third region 11C, a fourth region 11D, and a fifth region 11E in this order from the top. It is noted that the first to fifth regions 11A to 11E are set such that shaft centers of upper two bolts V among four bolts V (see FIG. 2) for fixing the bearing support portion 111 to the high-mount knuckle 11 coincide with the lower end portion of the fifth region 11E. In other words, the knuckle upper portion 113 according to the present embodiment corresponds to a portion above the shaft centers of the upper two bolts V.

When the load received by the wheel T at the tire contact point is transmitted from the bearing support portion 111 to the high-mount knuckle 11, the high-mount knuckle 11 is in a so-called cantilever state where a horizontal load F (see FIG. 3) directed from the outside to the inside in the width direction of the vehicle is applied to the knuckle upper end portion 115 while fixing the center of the bearing support portion 111.

The inventors of the present invention has found out from material mechanics that in a case where this cantilever (knuckle upper portion 113) is virtually divided into the regions 1, 2, 3, . . . N and has a shape that satisfies a predetermined flexural rigidity, the mass of the high-mount knuckle 11 is set at the minimum when a strain energy Ui and a mass Mi of the corresponding region satisfies the following formula 1:

$$U_i/M_i = \text{constant} (i=1,2,3\ldots N) \quad \text{(Formula 1)}$$

It is noted that since the first region 11A including the knuckle upper end portion 115 of the knuckle upper portion 113 is required to have an adequate connection strength to the shock absorber 15, the first region 11A is desirably excluded from objects of the formula 1. That is, among a plurality of regions obtained by dividing the cantilever (knuckle upper portion 113) as described above, a value obtained by dividing a strain energy in each of the other regions (second to fifth regions 11B to 11E), except for a region (first region 11A) including the knuckle upper end portion 115 and located at the uppermost position, by a mass of the corresponding region is desirably constant (see formula 1). On the other hand, when considering a design process of the high-mount knuckle 11, it is difficult to completely satisfy the formula 1. In this regard, the inventors of the present invention have found out that both the rigidity required for the high-mount knuckle 11 and the reduction in the number of design steps of the high-mount knuckle 11 can be achieved when the following relationship is satisfied. That is, among the plurality of regions obtained by dividing the cantilever (knuckle upper portion 113) as described above, the knuckle upper portion 113 desirably has the shape in which the minimum value among values obtained by dividing a strain energy in each of the other regions (second to fifth regions 11B to 11E), except for the region (first region 11A) including the knuckle upper end portion 115 and located at the uppermost position, by a mass of the corresponding region is at least equal to 0.70 times the maximum value thereamong.

EXAMPLES

Figure 4:
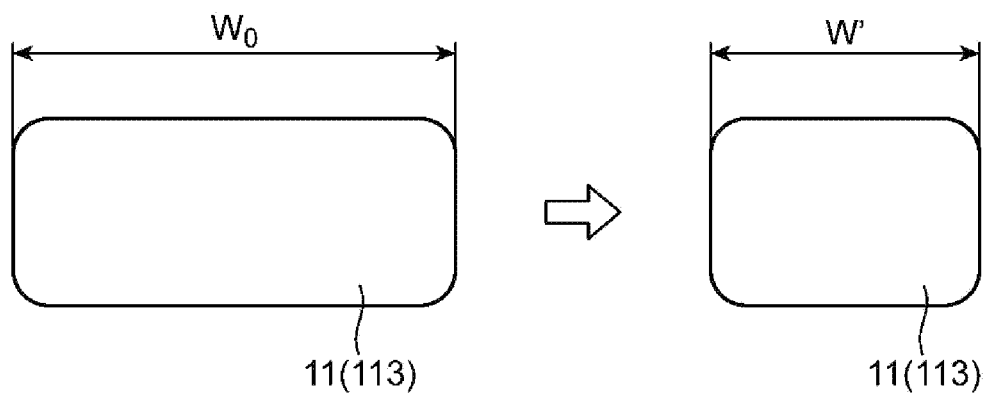
FIG. 4 is a cross-sectional view showing a state in which the vehicle knuckle according to the embodiment of the present invention is designed to reduce its width in the front-rear direction of the vehicle.
Figure 5:
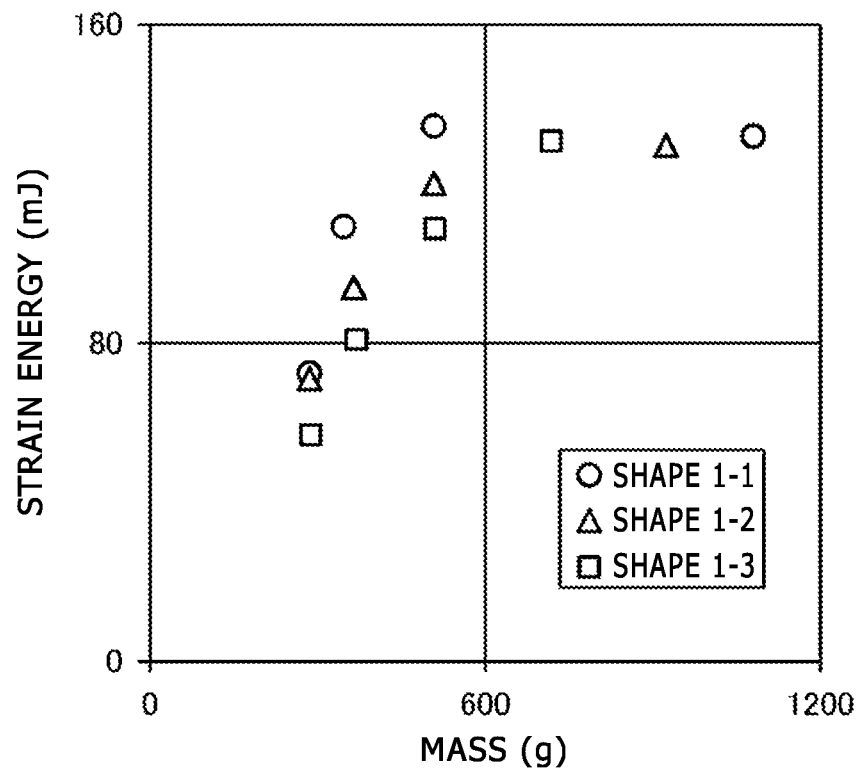
FIG. 5 is a graph showing a process of determining the shape of the vehicle knuckle according to the embodiment of the present invention, and specifically showing a relationship between a partial mass of the vehicle knuckle and a strain energy.

FIG. 4 is a cross-sectional view showing a state in which the high-mount knuckle 11 according to the present embodiment is designed to reduce its width in the front-rear direction of the vehicle during a design process. FIG. 5 is a graph showing a process of determining the shape of the high-mount knuckle 11 according to the present embodiment, and specifically showing First Example of a relationship between partial masses (of the second to fifth regions 11B to 11E) of the high-mount knuckle 11 and their strain energies. In Examples below, the horizontal load F of 2000 N was applied to the knuckle upper end portion 115. The strain energy caused by the horizontal load F in each region (first to fifth regions 11A to 11E) was calculated by Abaqus (finite element analysis software developed by Hibbitt, Karlsson & Sorensen, Inc. (HKS)).

Table 1 shows the masses and the strain energies of the first to fifth regions 11A to 11E in First Example.

the second to fifth regions 11B to 11E with the shape 1-2 except for the first region 11A was 0.546 (=0.141/0.258).

Furthermore, for the shape 1-3 which was formed by leveling out the strain energy per unit mass in each region with the shape 1-2, the masses of the first to fifth regions 11A to 11E were distributed in a range from 160 (g) to 719 (g) and increased from the upper to lower positions. The strain energy in each region was distributed in a range from 19 (mJ) to 131 (mJ). As a result, the strain energy per unit mass in each region was distributed in a range from 0.119 (J/kg) to 0.220 (J/kg). The minimum value/maximum value of the

TABLE 1

|  | Shape 1-1 | | | Shape 1-2 | | | Shape 1-3 | | |
| --- | --- | --- | --- | --- | --- | --- | --- | --- | --- |
|  | Mass (g) | Strain energy (mJ) | Strain energy per unit mass (J/kg) | Mass (g) | Strain energy (mJ) | Strain energy per unit mass (J/kg) | Mass (g) | Strain energy (mJ) | Strain energy per unit mass (J/kg) |
| 11A | 100 | 14 | 0.140 | 128 | 15 | 0.117 | 160 | 19 | 0.119 |
| 11B | 286 | 72 | 0.252 | 286 | 71 | 0.248 | 288 | 57 | 0.198 |
| 11C | 347 | 109 | 0.314 | 365 | 94 | 0.258 | 369 | 81 | 0.220 |
| 11D | 508 | 134 | 0.264 | 508 | 120 | 0.236 | 511 | 109 | 0.213 |
| 11E | 1081 | 132 | 0.122 | 925 | 130 | 0.141 | 719 | 131 | 0.182 |
| Total | 2322 | 461 |  | 2212 | 430 |  | 2047 | 397 |  |
| Minimum value/ Maximum value of strain energy per unit mass |  |  | 0.389 |  |  | 0.546 |  |  | 0.830 |

FIG. 5 and Table 1 show that the shape of the high-mount knuckle 11 is optimized in order from shape 1-1 to shape 1-2 and then shape 1-3. At this time, as shown in FIG. 4, the width $W_0$ in the front-rear direction of the vehicle, of each of the cross-sectional shapes of the first to fifth regions 11A to 11E in the knuckle upper portion 113 is reduced to the width W', thereby reducing the mass of each region. First, the weight of the entire high-mount knuckle with the shape 1-1 was approximately 4000 g. It is noted that the shape of the knuckle lower portion in the high-mount knuckle was not changed. As shown in Table 1, the masses of the first to fifth regions 11A to 11E, which were formed by equally dividing the knuckle upper portion 113 with the shape 1-1 into five regions, were distributed in a range from 100 (g) to 1081 (g), and increased from the upper to lower positions. The strain energy in each region was distributed in a range from 14 (mJ) to 134 (mJ). As a result, the strain energy per unit mass in each region was distributed in a range from 0.140 (J/kg) to 0.314 (J/kg). The minimum value/maximum value of the strain energy per unit mass in the second to fifth regions 11B to 11E with the shape 1-1 except for the first region 11A was 0.389 (=0.122/0.314).

On the other hand, for the shape 1-2 which was formed by further leveling out the strain energy per unit mass in each region with respect to the shape 1-1, the masses of the first to fifth regions 11A to 11E were distributed in a range from 128 (g) to 925 (g) and increased from the upper to lower positions. The strain energy in each region was distributed in a range from 15 (mJ) to 130 (mJ). As a result, the strain energy per unit mass in each region was distributed in a range from 0.117 (J/kg) to 0.258 (J/kg). The minimum value/maximum value of the strain energy per unit mass in strain energy per unit mass in the second to fifth regions 11B to 11E with the shape 1-3 except for the first region 11A was 0.830 (=0.182/0.220).

As described above, together with the change from the shape 1-1 to the shape 1-3, the minimum value/maximum value of the strain energy per unit mass increased from 0.389 to 0.830, thereby achieving the appropriate volume distribution (leveling) of the strain energies. At this time, although the mass of the knuckle upper portion 113 in the high-mount knuckle 11 could be reduced by appropriately 12% from 2322 (g) to 2047 (g), as a result, the rigidity of the knuckle upper portion 113 (which was inversely proportional to the total strain energy) increased by about 16% (1/461 to 1/397). As shown in FIG. 5, it is found that as the shape of the high-mount knuckle 11 changes from the shape 1-1 to the shape 1-2 and then the shape 1-3, points in a graph indicative of the relationship between the mass and the strain energy are distributed around a straight line that passes through zero (origin), so that the correlation coefficient between both factors, namely, the mass and the strain energy changes to approach 1.

Figure 6:
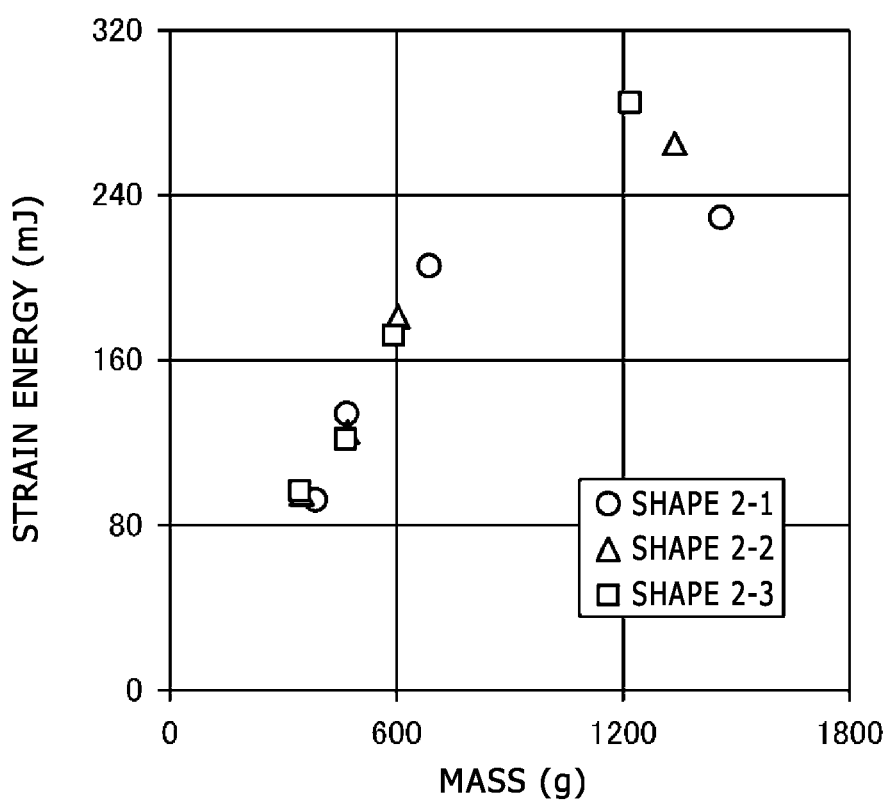
FIG. 6 is a graph showing a process of determining the shape of the vehicle knuckle according to the embodiment of the present invention, and specifically showing a relationship between a partial mass of the vehicle knuckle and a strain energy.

Similarly, FIG. 6 is a graph showing a process of determining the shape of the high-mount knuckle 11 according to the present embodiment, and specifically showing Second Example of a relationship between partial masses (of the second to fifth regions 11B to 11E) in the high-mount knuckle 11 and their strain energies.

Table 2 shows the masses and the strain energies of the first to fifth regions 11A to 11E in Second Example.

TABLE 2

| | Shape 1-1 | | | Shape 1-2 | | | Shape 1-3 | | |
|---|---|---|---|---|---|---|---|---|---|
| | Mass (g) | Strain energy (mJ) | Strain energy per unit mass (J/kg) | Mass (g) | Strain energy (mJ) | Strain energy per unit mass (J/kg) | Mass (g) | Strain energy (mJ) | Strain energy per unit mass (J/kg) |
| 11A | 141 | 21 | 0.149 | 142 | 20 | 0.141 | 142 | 20 | 0.141 |
| 11B | 386 | 92 | 0.238 | 350 | 95 | 0.271 | 344 | 97 | 0.282 |
| 11C | 469 | 134 | 0.186 | 471 | 125 | 0.265 | 465 | 122 | 0.262 |
| 11D | 686 | 206 | 0.300 | 604 | 181 | 0.300 | 592 | 172 | 0.291 |
| 11E | 1459 | 229 | 0.157 | 337 | 265 | 0.198 | 1218 | 285 | 0.234 |
| Total | 3141 | 682 | | 2904 | 686 | | 2761 | 696 | |
| Minimum value/ Maximum value of strain energy per unit mass | | | 0.523 | | | 0.661 | | | 0.805 |

FIG. 6 and Table 2 show a state in which the shape of the high-mount knuckle 11 is optimized in order from shape 2-1 to shape 2-2 and then shape 2-3. Also in this case, as shown in FIG. 4, the width $W_0$ in the front-rear direction of the vehicle, of each of the cross-sectional shapes of the first to fifth regions 11A to 11E in the knuckle upper portion 113 is reduced to the width W', thereby reducing the mass of each region. In the present example, the weight of the entire high-mount knuckle with the shape 2-1 was approximately 5400 g. It is noted that the shape of the knuckle lower portion in the high-mount knuckle was not changed. As shown in Table 2, the masses of the first to fifth regions 11A to 11E, which were formed by equally dividing the knuckle upper portion 113 with the shape 2-1 into five regions, were distributed in a range from 141 (g) to 1459 (g), and increased from the upper to lower positions. The strain energy in each region was distributed in a range from 21 (mJ) to 229 (mJ). As a result, the strain energy per unit mass in each region was distributed in a range from 0.149 (J/kg) to 0.300 (J/kg). The minimum value/maximum value of the strain energy per unit mass in the second to fifth regions 11B to 11E with the shape 2-1 except for the first region 11A was 0.523 (=0.157/ 0.300).

On the other hand, for the shape 2-2 which was formed by leveling out the strain energy per unit mass in each region with respect to the shape 2-1, the masses of the first to fifth regions 11A to 11E were distributed in a range from 142 (g) to 1337 (g) and increased from the upper to lower positions. The strain energy in each region was distributed in a range from 20 (mJ) to 265 (mJ). As a result, the strain energy per unit mass in each region was distributed in a range from 0.141 (J/kg) to 0.300 (J/kg). The minimum value/maximum value of the strain energy per unit mass in the second to fifth regions 11B to 11E with the shape 2-2 except for the first region 11A was 0.661 (=0.198/0.300).

Furthermore, for the shape 2-3 which was formed by further leveling out the strain energy per unit mass in each region with respect to the shape 2-2, the masses of the first to fifth regions 11A to 11E were distributed in a range from 142 (g) to 1218 (g) and increased from the upper to lower positions. The strain energy in each region was distributed in a range from 20 (mJ) to 285 (mJ). As a result, the strain energy per unit mass in each region was distributed in a range from 0.141 (J/kg) to 0.291 (J/kg). The minimum value/maximum value of the strain energy per unit mass in the second to fifth regions 11B to 11E with the shape 2-3 except for the first region 11A was 0.805 (=0.234/0.291).

As described above, together with the change from the shape 2-1 to the shape 2-3, the minimum value/maximum value of the strain energy per unit mass increased from 0.523 to 0.805, thereby achieving the appropriate volume distribution (leveling) of the strain energies. At this time, although the mass of the knuckle upper portion 113 in the high-mount knuckle 11 could be reduced by appropriately 12% from 3141 (g) to 2761 (g), as a result, the rigidity of the knuckle upper portion 113 (which is inversely proportional to the total strain energy) was kept at the substantially same level (1/682 to 1/696). As shown in FIG. 6, it is found that as the shape of the high-mount knuckle 11 changes from the shape 2-1 to the shape 2-2 and then the shape 2-3, points in a graph indicative of the relationship between the mass and the strain energy are distributed around a straight line that passes through zero (origin), so that the correlation coefficient between both factors, namely, the mass and the strain energy changes to approach 1.

Figure 7:
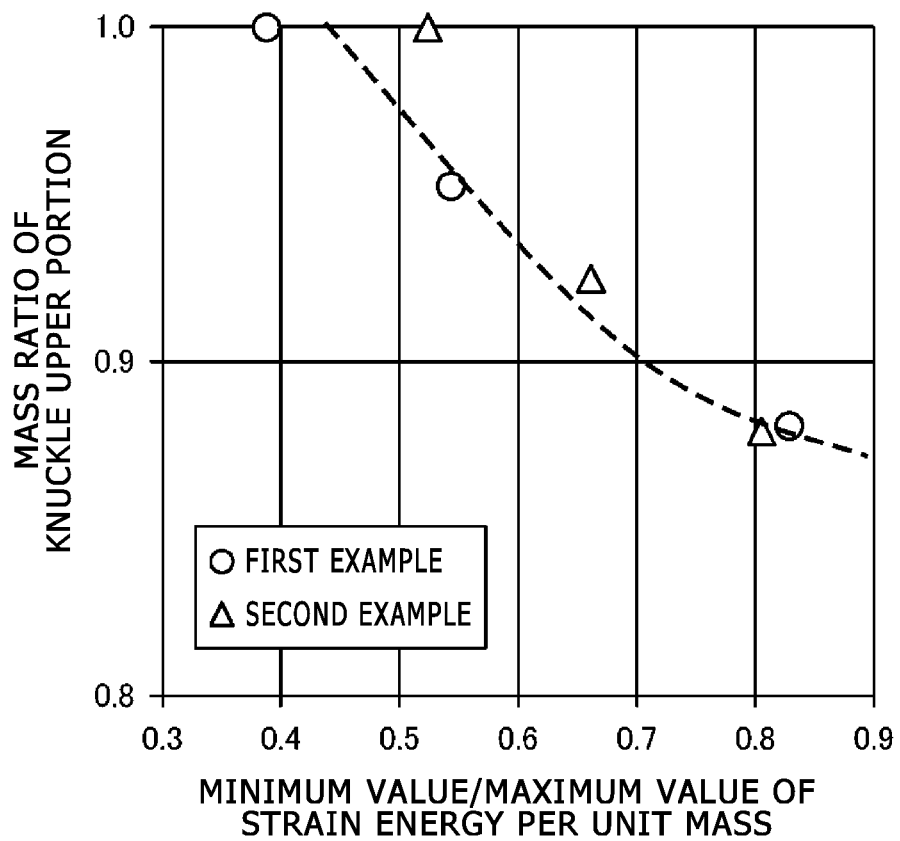
FIG. 7 is a graph showing a relationship between a change in the mass (mass ratio) and a maximum value/minimum value ratio of the strain energy per unit mass in the process of determining the shape of the vehicle knuckle according to the embodiment of the present invention.

FIG. 7 is a graph showing a relationship between a change in the mass (mass ratio) and a ratio (minimum value/ maximum value) of the strain energy per unit mass in the process of determining the shape of the high-mount knuckle 11 according to the present embodiment. More specifically, in FIG. 7, the sum of the masses of the respective regions in each of the shapes 1-1, 1-2, and 1-3 of Table 1 and the shapes 2-1, 2-2, and 2-3 of Table 2 in First and Second Examples described above is plotted on the vertical axis, while the ratio of the minimum value/maximum value of the strain energy per unit mass in each shape of First and Second Examples is plotted on the horizontal axis. It is noted that each point on the vertical axis indicates the mass ratio of the sum of the masses in one of these shapes to that in the shape 1-1 or 2-1. As shown in FIG. 7, the shape of the knuckle upper portion 113 is set such that the ratio of the minimum value/maximum value of the strain energy per unit mass is at least equal to 0.70, thereby reducing the weight of the knuckle upper portion 113 of the high-mount knuckle 11 by 10% or more.

The high-mount knuckle 11 (vehicle knuckle) according to the embodiment of the present invention has been described above. According to the high-mount knuckle 11, the rigidity of the high-mount knuckle 11 against the force directed from the outside to the inside in the width direction of the vehicle can be improved, while enabling a reduction in the weight of the high-mount knuckle 11. By forming the high-mount knuckle 11 through hot forging using an aluminum alloy material, the reliability and strength of the material microstructure of the vehicle high-mount knuckle can be enhanced. In addition, the 0.2% proof stress of the high-mount knuckle 11 in a tensile test is desirably 350 MPa or more. In this case, the reduction in the weight of the vehicle high-mount knuckle can be promoted. The present invention is not limited to these embodiments. The following modifications can be implemented as the present invention.

(1) In the embodiments mentioned above, the vehicle knuckle according to the present invention is described based on the high-mount knuckle 11, but the present invention is not limited thereto. The present invention can be applied to any vehicle knuckle made of an aluminum alloy and having a different shape (length) from that of the above-mentioned high-mount knuckle 11. To improve the rigidity of the vehicle knuckle and reduce the weight of the vehicle knuckle, the length H of the region including the five regions 11A to 11E shown in FIG. 2 is desirably set in a range from 150 mm to 400 mm as mentioned above.

(2) In the embodiments mentioned above, the knuckle upper portion 113 of the high-mount knuckle 11 is described in the form of being equally divided into five regions, but the present invention is not limited thereto. The knuckle upper portion 113 may be equally divided into six or more regions.

Figure 8:
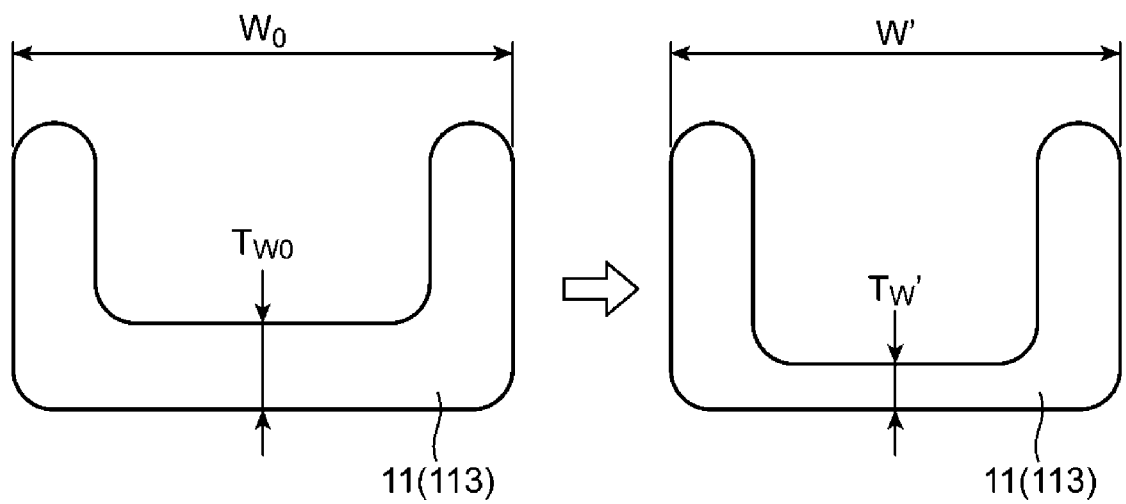
FIG. 8 is a cross-sectional view showing a state in which the vehicle knuckle according to the embodiment of the present invention is designed to reduce its width in the front-rear direction of the vehicle and its thickness in the width direction of the vehicle.

(3) In the embodiments mentioned above, the leveling of the strain energy per unit mass in the respective regions of the knuckle upper portion 113 is described in the form of the reduction in the width of the cross-sectional shape of the knuckle upper portion 113 in the front-rear direction as shown in FIG. 4, but the present invention is not limited thereto. FIG. 8 is a cross-sectional view showing a state in which the high-mount knuckle 11 according to the embodiment of the present invention is designed to reduce its width in the front-rear direction of the vehicle and its thickness in the width direction of the vehicle. As shown in FIG. 8, the knuckle upper portion 113 of the high-mount knuckle 11 has a U-shaped cross section, its width in the front-rear direction of the vehicle is reduced from $W_0$ to $W'$, and its thickness in the width direction of the vehicle is reduced from $T_{W0}$ to $T_{W'}$, whereby the strain energy per unit mass may be leveled over the respective regions.

As mentioned above, the high-mount knuckle 11 according to the present invention is designed such that in a position where the high-mount knuckle 11 is fitted to a vehicle main body of the motor vehicle, when the knuckle upper portion 113 is equally divided into five or more regions along a vertical direction and a horizontal load F directed from an outside to an inside in a width direction of the vehicle is applied to the knuckle upper end portion 115 while fixing the center of the bearing support portion 111, the minimum value among values obtained by dividing a strain energy in each of the other regions of the five or more regions, except for a region (first region 11A) including the knuckle upper end portion 115 and located at the uppermost position, by a mass of the corresponding region is at least equal to 0.70 times the maximum value thereamong. According to this design method, the rigidity of the high-mount knuckle 11 (vehicle knuckle) made of an aluminum alloy, against the force directed from the outside to the inside in the width direction of the vehicle can be improved, while reducing the weight of the high-mount knuckle 11.

The present invention provides a vehicle knuckle made of an aluminum alloy, which includes: a bearing support portion configured to support a bearing portion forming a rotational axis of a wheel; a knuckle upper portion extending upward from the bearing support portion and having a knuckle upper end portion; and a knuckle lower portion extending downward from the bearing support portion and connected to a lower arm, wherein in a position where the vehicle knuckle is fitted to a vehicle main body, the knuckle upper portion has a shape in which, when the knuckle upper portion is equally divided into five or more regions along a vertical direction and a horizontal load directed from an outside to an inside in a width direction of a vehicle is applied to the knuckle upper end portion while fixing a center of the bearing support portion, a minimum value among values obtained by dividing a strain energy in each of the other regions of the five or more regions, except for a region including the knuckle upper end portion and located at an uppermost position, by a mass of the corresponding region is at least equal to 0.70 times a maximum value thereamong.

With this configuration, the rigidity of the vehicle knuckle against the force directed from the outside to the inside in the width direction of the vehicle can be improved, while enabling a reduction in the weight of the knuckle.

In the configuration described above, the knuckle is desirably formed by hot forging using an aluminum alloy material.

With this configuration, the reliability and strength of the material microstructure of the vehicle knuckle can be enhanced.

In the configuration described above, a 0.2% proof stress of the vehicle knuckle in a tensile test is desirably 350 MPa or more.

With this configuration, the reduction in the weight of the vehicle knuckle can be promoted.

The invention claimed is:

1. A vehicle knuckle made of an aluminum alloy, comprising:
   a bearing support portion configured to support a bearing portion forming a rotational axis of a wheel;
   a knuckle upper portion extending upward from the bearing support portion, the knuckle upper portion having a knuckle upper end portion; and
   a knuckle lower portion extending downward from the bearing support portion and connected to a lower arm,
   wherein in a position where the vehicle knuckle is fitted to a vehicle main body, the knuckle upper portion has a shape in which, when the knuckle upper portion is equally divided into five or more regions along a vertical direction and a horizontal load directed from an outside to an inside in a width direction of a vehicle is applied to the knuckle upper end portion while fixing a center of the bearing support portion, a minimum value among values obtained by dividing a strain energy in each of other regions of the five or more regions, except for a region including the knuckle upper end portion and located at an uppermost position, by a mass of the corresponding region is at least equal to 0.70 times a maximum value thereamong.

2. The vehicle knuckle according to claim 1, wherein the vehicle knuckle is formed by hot forging using an aluminum alloy material.

3. The vehicle knuckle according to claim 2, wherein a 0.2% proof stress of the vehicle knuckle in a tensile test is 350 MPa or more.

* * * * *